Oct. 15, 1935. J. A. ANGLADA ET AL 2,017,196
VALVE PORT SEALING DEVICE
Filed April 29, 1931 7 Sheets-Sheet 1
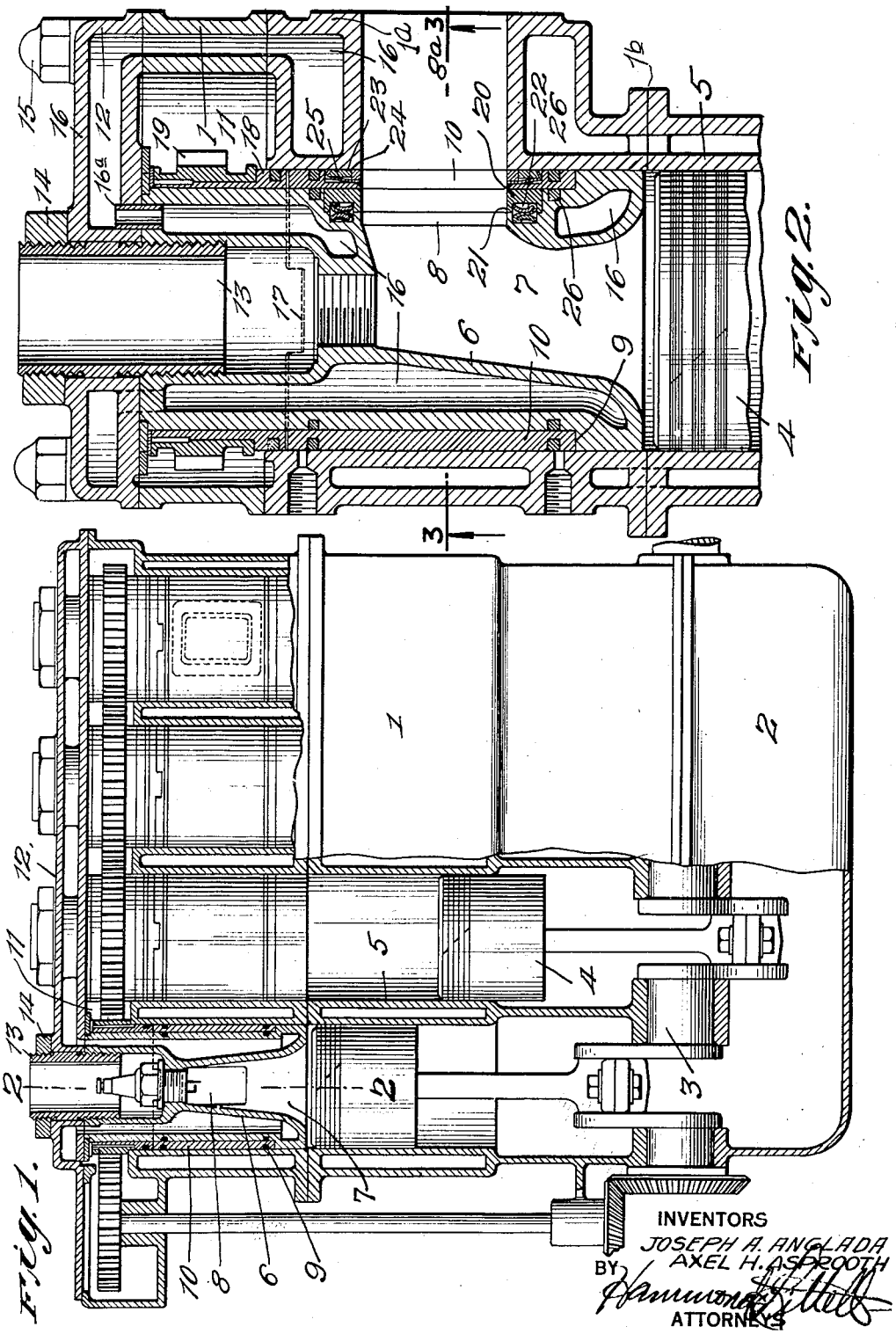
INVENTORS
JOSEPH A. ANGLADA
AXEL H. ASPROOTH
BY
ATTORNEYS

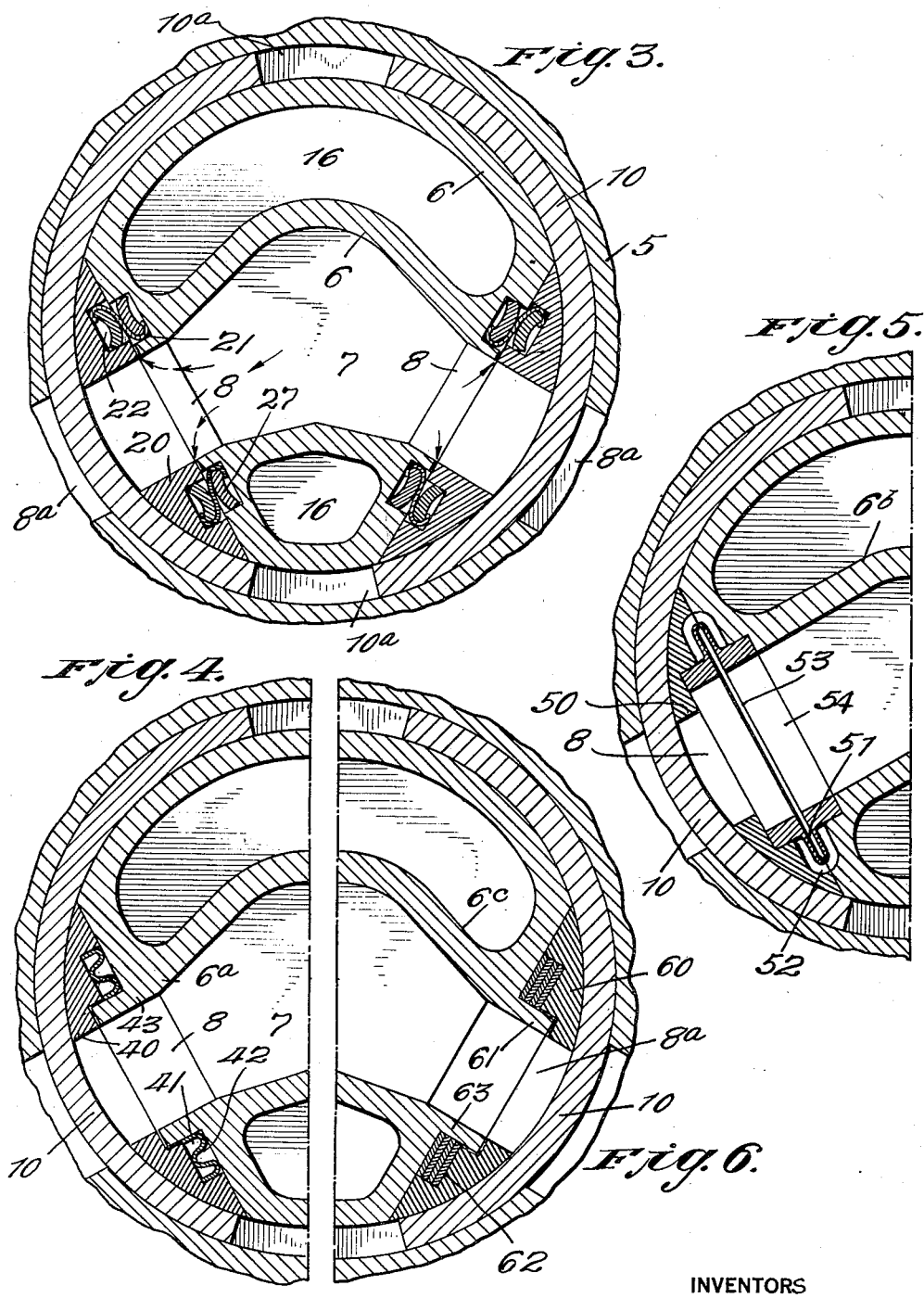

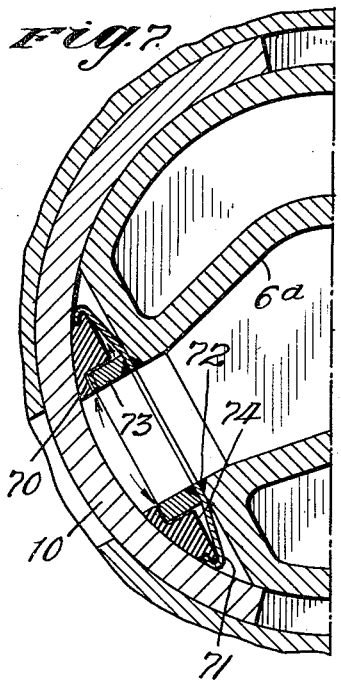
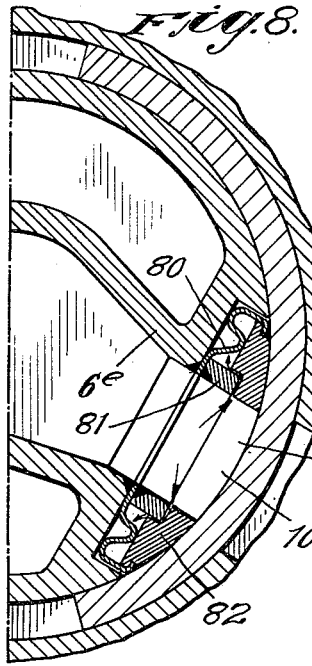
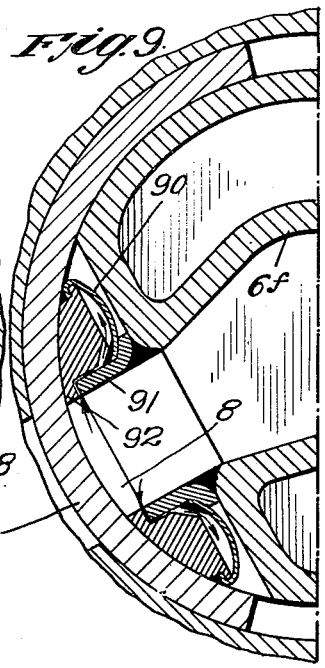
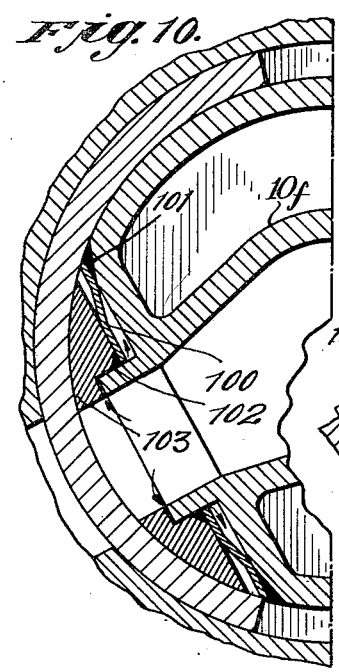
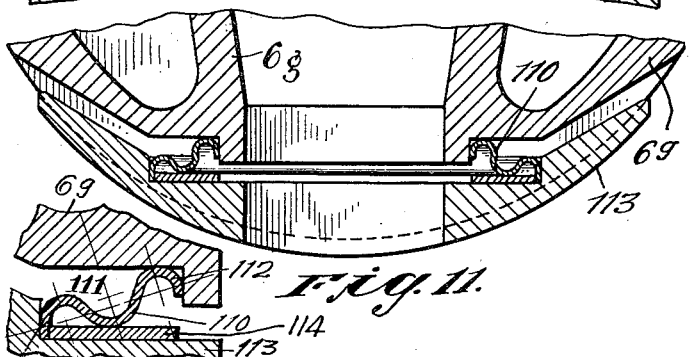
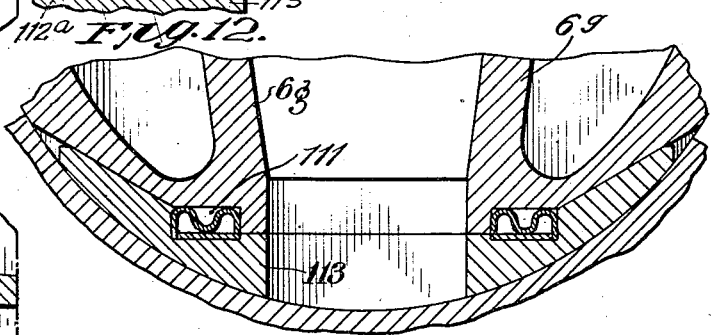

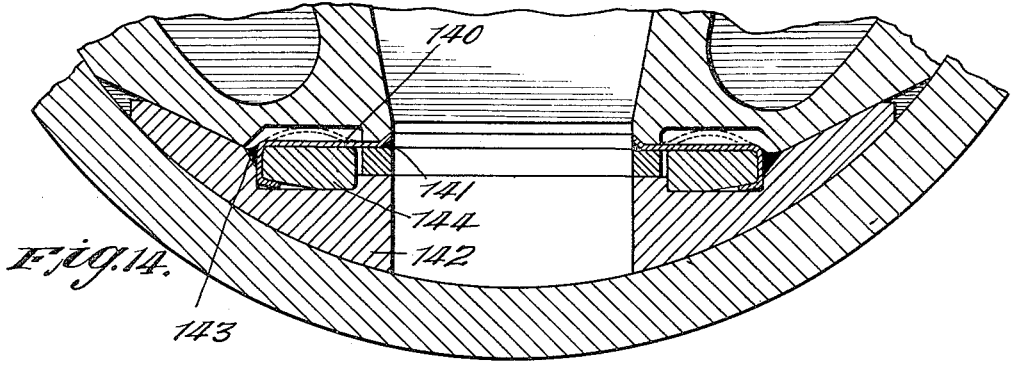
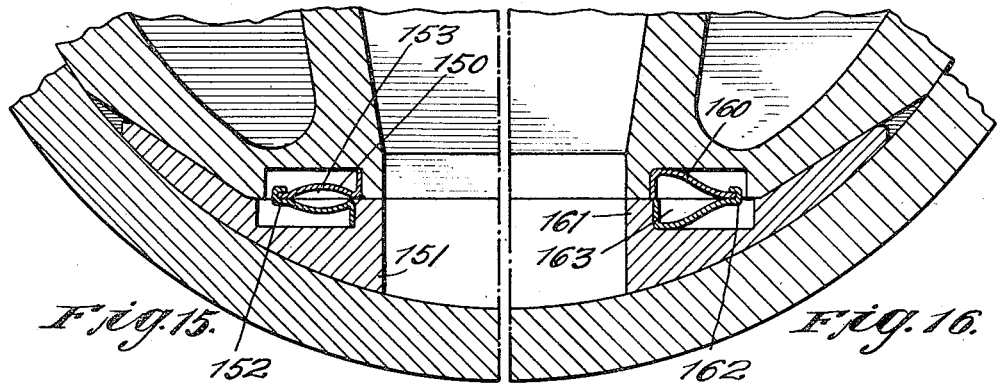
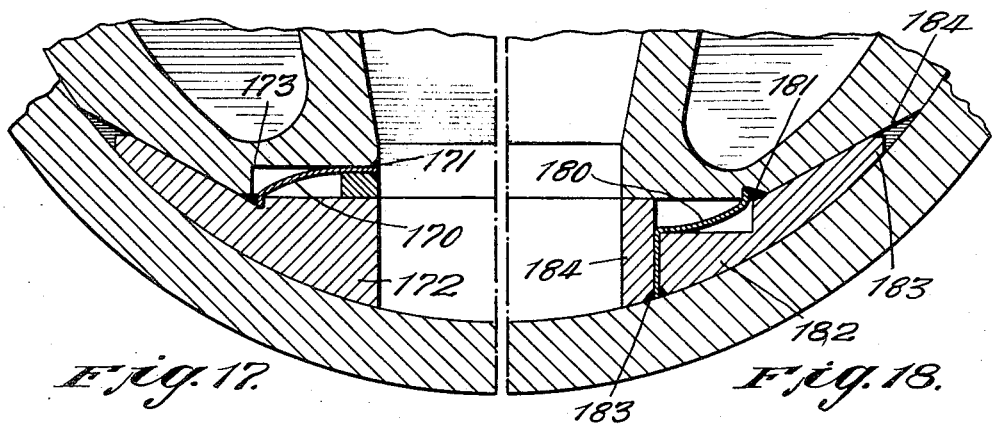

Oct. 15, 1935.  J. A. ANGLADA ET AL  2,017,196
VALVE PORT SEALING DEVICE
Filed April 29, 1931    7 Sheets-Sheet 5
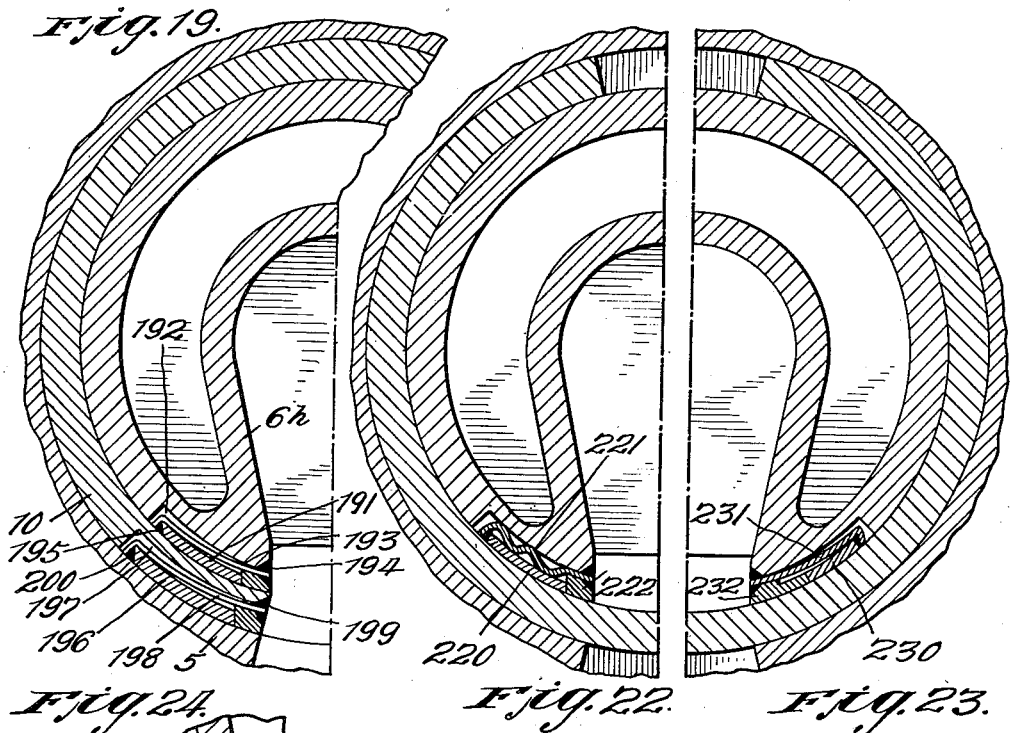
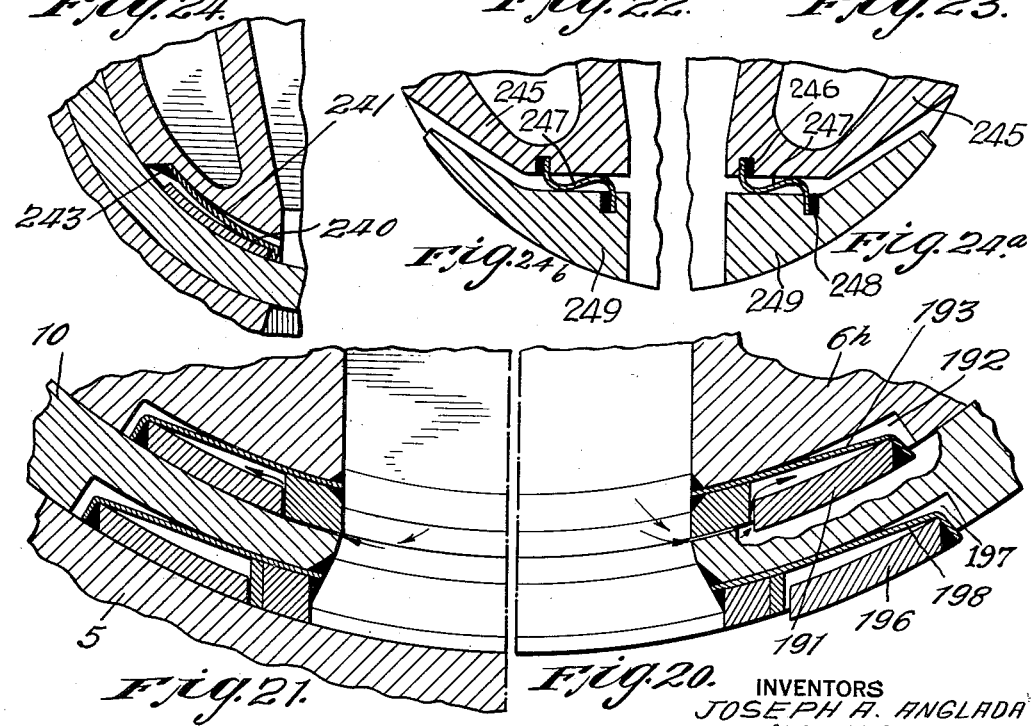
INVENTORS
JOSEPH A. ANGLADA
AXEL H. ASPROOTH
BY
ATTORNEYS Oct. 15, 1935.    J. A. ANGLADA ET AL    2,017,196
VALVE PORT SEALING DEVICE
Filed April 29, 1931    7 Sheets-Sheet 6
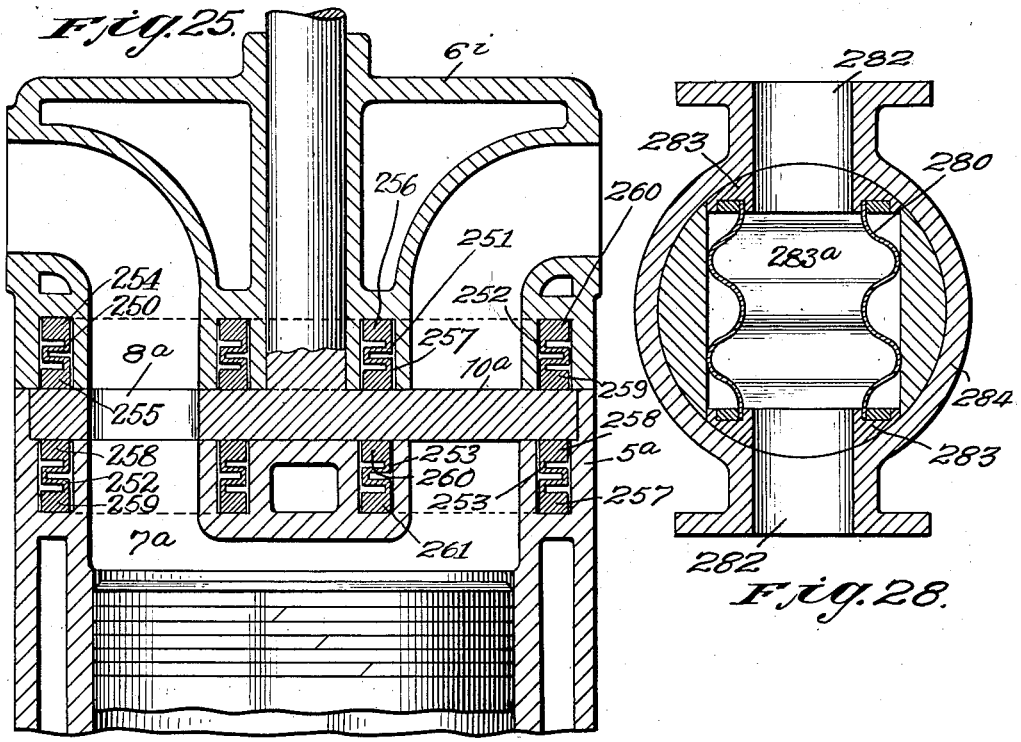
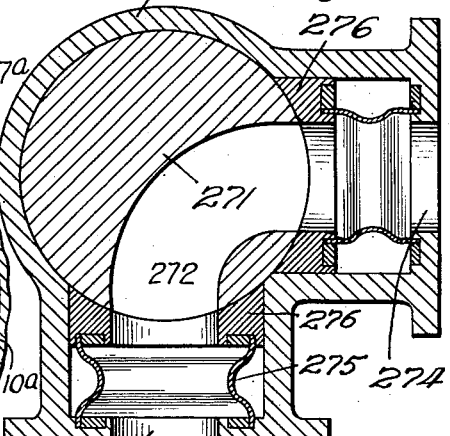
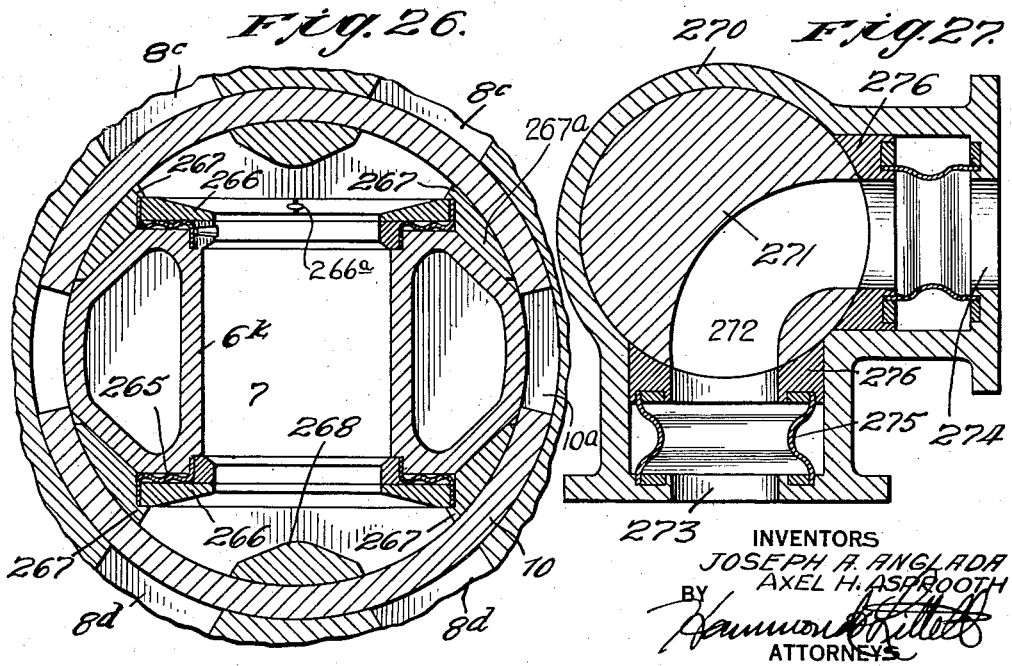
INVENTORS
JOSEPH A. ANGLADA
AXEL H. ASPROOTH
BY
ATTORNEYS

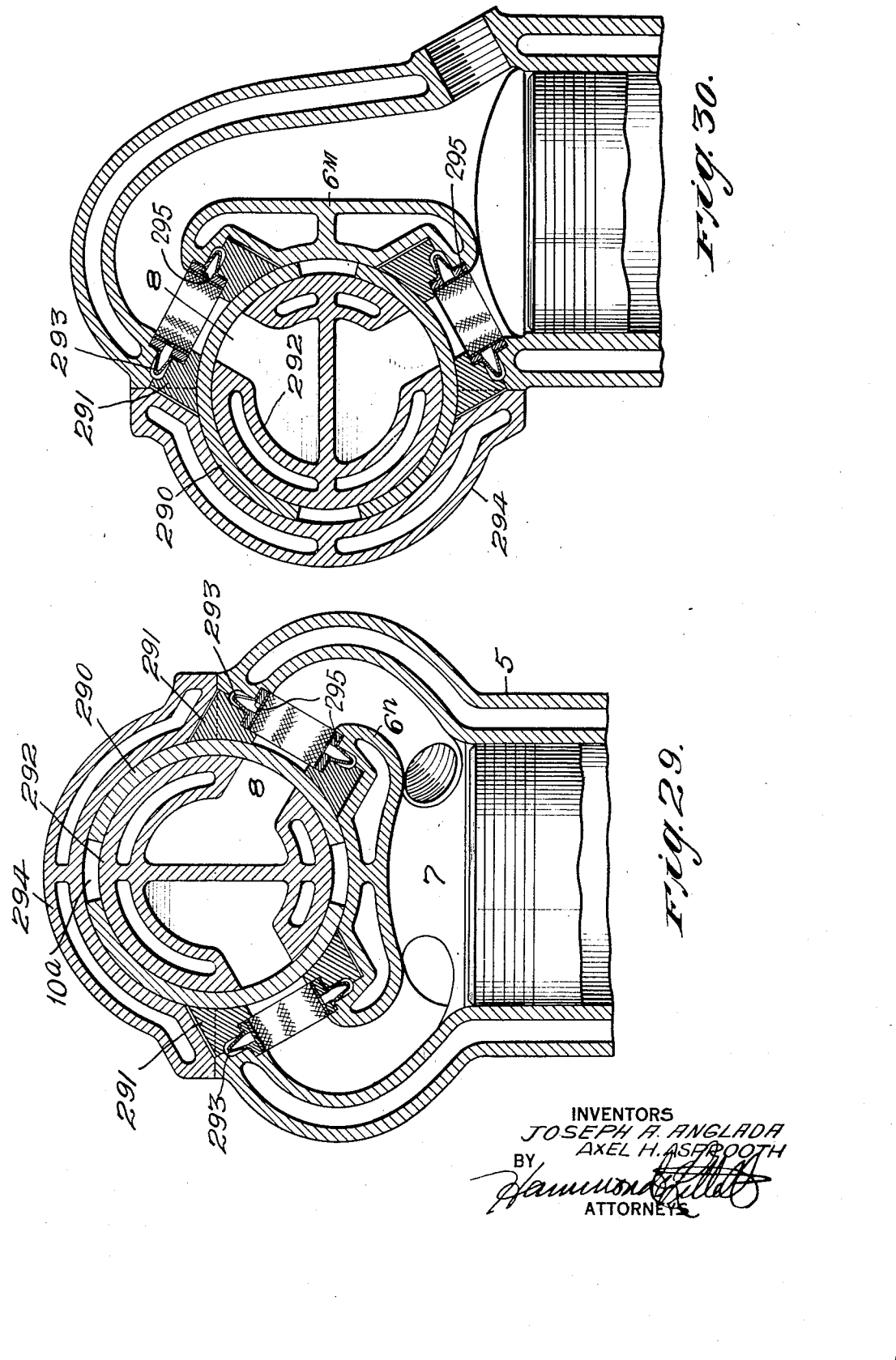

Patented Oct. 15, 1935

2,017,196

UNITED STATES PATENT OFFICE 2,017,196

VALVE PORT SEALING DEVICE

Joseph A. Anglada and Axel H. Asprooth, New York, N. Y., assignors to Anglada Motor Corporation, New York, N. Y., a corporation of Delaware Application April 29, 1931, Serial No. 533,604

12 Claims. (Cl. 123—59)

This invention relates to improvements for sealing rotary valves against pressure loss through the ports thereof and more particularly relates to an improvement in sealing devices for sealing the valve ports of internal combustion engines against leakage.

Internal combustion engines of the rotary valve type either of plug valve or sleeve valve form have been somewhat inefficient in operation due to the difficulty of effectively sealing the combustion chamber against pressure leakage. To compensate for temperature changes and to reduce friction it has been necessary to allow considerable clearance for the valve member operating in its particular pocket. If the clearance is reduced, the friction increases and with the extreme changes of temperature causes binding of the valve member; and if the clearance is increased there is the consequent increase in pressure loss.

It is one of the objects of our invention to provide effective lateral sealing means around the ports of rotary valve members as used in various types of mechanical constructions.

A principal specific object of this invention is to provide a rotary valve internal combustion engine with an effective port sealing member which will permit suitable valve clearances and which will make possible the increase in compression pressures, without loss of compression or explosion pressure due to leakage past the exhaust and inlet ports into the valve space.

Another object of this invention is to provide a diaphragm sealing means extending around the port opening in rotary valve internal combustion engines which will cooperate with sealing plugs to decrease pressure loss and which will be increasingly more effective as the pressure increases within the combustion chamber.

Another object of this invention is to provide a combination sealing plug and diaphragm integrally connected with the plug and cylinder of internal combustion engines whereby the sealing plug is resiliently pressed against the valve without loss of gas pressure.

It is another object of this invention to provide a valve structure with a sealing plug mounted in the fixed portion and connected by a diaphragm thereto which resiliently and without loss of pressure seals the sealing plug against the rotating valve structure to continuously seal the port.

Another object is to provide a rotary sleeve valve internal combustion engine of the type described in our Patent No. 1,839,458, January 5, 1932, with sealing means around the valve ports, comprising pressure rings or plugs connected by resilient diaphragms in such a way that the compression and explosion pressure is utilized to press the sealing rings more firmly against the cooperating member.

While some of the objects of our invention have been specifically enumerated to illustrate the applications of our invention, further objects and advantages of this invention will appear from the following description thereof taken in connection with the accompanying drawings which illustrate preferred forms of embodiment of the device and in which;

Figure 1 is a side elevation partially in section of an internal combustion engine of the rotary sleeve valve type.

Figure 2 is a vertical section substantially on the line 2—2 through the top of Figure 1, showing the adaptation of the sealing means.

Figure 3 is a horizontal cross section through a single cylinder substantially on the center line of the valve port as indicated at 3—3 of Figure 2 showing one embodiment of sealing means.

Figure 4 is a horizontal section through one half of one cylinder including only one port and showing a modified form of sealing diaphragm.

Figures 5, 6, 7, 8, 9 and 10 are horizontal sectional views similar to Figure 4, and showing further modifications of the sealing diaphragm.

Figures 11, 12 and 13 are partial horizontal sections showing a further modified form having a double curved diaphragm in the unassembled, detail, and assembled views.

Figures 14, 15, 16, 17 and 18 show further modified forms of diaphragm sealing means with various means for securing the diaphragms in position.

Figures 19, 20, 21, 22, 23 and 24 are also partial horizontal sections showing a still further modified form of sealing means in which the sealing shoe is arcuately curved and relatively thin.

Figures 24a and 24b are partial horizontal sections through modified forms of construction, the parts being in partial assembled position.

Figure 25 is a central vertical section showing a modified embodiment of the invention applied to a rotary disk valve.

Figure 26 is a horizontal section through an internal combustion engine showing sealing plugs for a double ported cylinder.

Figures 27 and 28 are horizontal cross sections through common gate valves showing the adaptation of the sealing plugs and diaphragms in common valve constructions.

Figures 29 and 30 are vertical sections showing the sealing means applied to different forms of rotary sleeve valve internal combustion engines.

The internal combustion engine particularly shown in Figure 1 to illustrate our invention consists of the usual cylinder block 1, a crank case 2, containing the crank shaft 3 which operates pistons 4 in the cylinders 5 in the well known manner. A cylinder head 6 forms the combustion chamber 7, the head having suitable ports 8, and provided with an external annular pocket or recess 9 in which the rotary sleeve valve 10 operates as described in our Patent No. 1,839,458, January 5, 1932. The cylinder head 6 extends above the cylinder 5 and into the valve gear chamber 11, which chamber is covered by a cylinder block cover 12. The cylinder block cover 12 is adapted to receive the cylinder head centering devices 13 which are screw threaded into the cylinder head and are adapted to closely fit the cover 12 and be secured to it by the nut 14, thereby suspending the cylinder heads freely within the cylinders. The cylinder cover 12 is secured in turn to the cylinder block 1 by suitable bolts 15. The cylinder head 6 is suitably cooled preferably by water in the water chambers 16 which are in communication with the chamber 16 surrounding the cylinder head 6 through the tubes 16a. The combustion chamber 7 as well as the valve sleeve 10 is thus entirely water cooled. The tubes 16a also act as dowel pins to prevent the head from turning. The cylinder block 1 is preferably formed in two parts, the lower carrying the usual bearing assembly and the upper part 1a of the block carrying the valve sleeves and cylinder heads. The upper part 1a of the block is joined along the line 1b by bolts in any well known manner.

The sleeves 10 are provided with key slots 17 which cooperate and engage with the driving member 18 to which the gear 19 is non-rotatably affixed. The gears 19 are driven through suitable gearing from the crank shaft and preferably by means of a chain drive (not shown) from the first gear which rotates the valve sleeves at the desired rate and in the desired timing.

As the valve sleeves 10 rotate they open and close the inlet and exhaust ports 8 and when closed the inlet and exhaust ports 8 in the combustion chamber 7 must sufficiently seal the combustion chamber 7 so as to prevent the escape of compression and explosion pressure around the valve ports. The clearance of the valves must of necessity be sufficiently great to prevent binding and undue friction in their annular path between the walls of the cylinders 5 and the heads 6, and such clearance would normally permit unduly great pressure loss. In order to seal the ports 8, of which there are usually two in each cylinder, a preferably segmental shoe 20 carried by the cylinder heads 6 is mounted adjacent the ports 8, and surrounding the same. The shoe 20 is curved on its outer periphery to engage the inner surface of the sleeve 10 and is adapted to be pressed against the sleeve to prevent leakage around the ports 8. To prevent leakage behind the shoes 20 a resilient diaphragm 21 is mounted in a suitable pocket 22 between the cylinder head 6 and the shoe 20, which diaphragm is sealed to the shoe and the head 6 and resiliently forces the shoe against the sleeve 10. If desired, the sleeve may also be provided with a shoe 23 (Figure 2) mounted in the pocket 24 in the valve sleeve and be similarly provided with a diaphragm 25, which diaphragm seals the valve with respect to the cylinder 5 and resiliently forces the shoe carried by the valve against the cylinder wall. Sealing rings 26 are also provided around the top and bottom of the cylinder heads and sleeves to aid in sealing the ports and prevent loss of gases directly from the lower portion of the combustion chamber and to control lubricant.

Several forms of embodiments of shoes and diaphragms are shown and the details of one diaphragm are more particularly shown in Figure 3, in which the cylinder wall 5 is provided with the rotary valve sleeve 10 which operates between the cylinder wall 5 and the inserted cylinder head 6 which is internally cooled by water in the water chamber 16. The combustion chamber 7 is provided with ports 8 for the intake and exhaust and the cylinder block is provided with ports 8a cooperating with the ports 8 when the ports 10a in the sleeve valve are brought into alinement with these ports 8 and 8a. Adjacent each of the ports 8, the cylinder head 6 is provided with the rectangular shoes 20 which are arcuately curved to cooperate with the valve sleeve 10 and which are provided with suitable pockets 22 in which the sealing diaphragm 21 is mounted. In the particular construction shown in Figure 3, the diaphragm is secured by the means of inserts 27 which are curved and which engage the diaphragm on the edges and securely seal the diaphragm respectively in the shoe 20 and the cylinder head 6. The port is usually oblong or oval in shape and the shoe 20 extends continuously around the port. The diaphragm 22 is slightly greater in length than the distance between the adjacent curved retainers 27 and is made of resilient material, preferably steel, adapted to exert a slight tension forcing the shoe against the sleeve valve. This is normally sufficient to afford an effective seal, but as the shoe moves toward the valve a slight amount from the cylinder head 6, the compression or explosion pressure in the chamber 7 enters behind the shoes 20 as indicated by the arrows in Figure 3, and as it is prevented from escape by the diaphragms 21 forces the shoes against the valve sleeves.

In operation, therefore, the shoes are mounted in the cylinder head 6 and the sleeve valve 10 is forced over the shoes which are retracted to receive the valve but which subsequently bear against the inner surface of the same. During compression a high pressure is built up within the combustion chamber, and this pressure cannot leak out of the ports 8, due to the sealed diaphragms, and the shoe which bears against the valve. After combustion the pressure created in the combustion chamber is much higher and this pressure cannot leak from the combustion chamber and it serves additionally to increase the pressure of the shoes against the valve. As the shoes have a relatively small bearing surface with respect to the total bearing area between the valve sleeve and the cylinder head the friction is not materially increased and the remaining portion of the cylinder head may have a greater clearance than the shoes. There is always a continuous pressure on the shoes which pressure increases with the gas pressure in the combustion chamber. The shoes are secured to the cylinder head 6 which does not rotate thus reducing the energy required to rotate the sleeve valve. The shoes always seal the combustion chamber, and much higher efficiency can be obtained from an engine with such pressure seals.

A slightly different form of sealing diaphragm is shown in Figure 4, and in somewhat greater detail in Figures 11, 12 and 13. The shoes 40 are provided with pockets 41 which cooperate with the cylinder heads 6a to form a space sufficiently large to receive the diaphragm 42. The diaphragm is in the form of a double curved resilient member extending around the port 8 and resiliently forcing the shoes 40 against the sleeve valve 10. In this form the cylinder head 6a is provided with an integral projection 43 which surrounds the ports 10a when these ports are in register with the ports 8 and 8a and which extends into the shoe 40 and forms an abutment which prevents the shoe from moving or tending to travel with the rotary valve. The shoe is adapted to closely seal the port 8 and is also adapted for slight movement which will permit the gas within the combustion chamber 7 to co-act with the diaphragm 42 and additionally force the shoe 40 into pressure-tight contact with the valve sleeve.

Another form of construction is shown in Figure 5 in which the shoe 50 seals a port 8 by movement against the valve sleeve 10. Toward this end, an annular expansion member 51 fits between the shoe and the cylinder head 6b. The expansion member 51 is provided with a diaphragm 51a in the form of a bellows which extends into an annular recess 52 which permits the respective portions of the bellows to move and to force the shoes 50 against the sleeve valve 10. The expansion member 51 is provided with a central opening 53 which permits the gas pressure to enter between the abutting portions 54 and exert a pressure on the shoe 50 and is sealed to the head and the shoe by means of a press fit, welding or the like. At substantially all times there is a superatmospheric or subatmospheric pressure within the combustion chamber and such pressure will at all times therefore force the shoes into tight relation against the valve. The abutting portions 54 of the bellows can be varied in area to effectively change the pressure on the shoes 50.

It will be understood that in Figures 4 and 5 as well as in the other figures that only one half of the horizontal section through the cylinder has been shown and that the intake port will be identical with the exhaust port in that they are entirely separate and provided with separate diaphragms in a manner shown as in Figure 3.

In Figure 6 the shoe 60 is held in abutting relation with the cylinder head 6c by the projecting portion 61 which extends into the shoe and prevents travel thereof with the valve 10. The crack is sealed by a plurality of sealing members 62 which are composed of layers of resilient fibrous packing such as asbestos compositions or the like and will prevent loss of gas pressure due to the movement of the sealing shoes 60 against the sleeve valve 10 after considerable wear. The shoes 60 and packing 62 effectively seal the port 8a under all conditions and the projecting edge 63 of the cylinder head centers the shoe from movement. The members 62 may also be suitable metallic members, reversely curved inherently, but shown flattened out to create sufficient primary tension thus holding the shoe 60 against the valve sleeve 10.

The sealing construction shown in Figure 7 consists of a shoe 70 and spring diaphragm 71 which is welded at 72 to the cylinder head 6d and is crimped on the other end to make a gas tight seal with the shoe 70. An additional ring 73 is additionally welded to the diaphragm 72 and cylinder head 6d which block extends into the shoe 70 and prevents travel of the same with the rotary valve 10. The use of the ring 73 assists also in conducting the heat away from the weld 72 in the welding operation and prevents overheating of the thin diaphragm material. The diaphragm is of the single blade sheet steel type and extends around the edge of the shoes 70 to which it is secured preferably by welding in such manner as to prevent pressure loss and to force the shoes against the valve sleeves 10. Sufficient clearance is provided between the shoe and the ring 73 for gas to enter within the space 74 between the shoe and the diaphragm 72 so that the additional pressure within the chamber will assist in forcing the shoe against the sleeve.

A modified form of construction is shown in Figure 8. In this form of the invention a diaphragm 80 is welded along the inner edge thereof to the cylinder head 6e and also to a ring member 81. The sealing shoe proper is designated at 82 and the outer edge of the diaphragm 80 is crimped or otherwise secured to the outer edge of the shoe 82. The ring 81 fits within an annular recess in the sealing shoe 82 and thus the latter is positioned properly to surround the port 8. In this view a pair of oppositely directed arrows indicate the point of entry of gas pressure into the space between the diaphragm 80 and the sealing shoe 82. By such a construction the shoe is forced against the sleeve valve and the port 8 is completely sealed against loss of pressure. The actual contact area between the shoe 82 and the sleeve valve 10 is relatively small and consequently the valve 10 may be rotated with little application of power by the driving mechanism by which the valve is rotated.

In Figure 9, a still further modified form of construction is shown. In this form of the invention a ring 91 of tubular form and having an outwardly flared edge is welded or otherwise secured at this edge to the cylinder head 6f. A diaphragm 90 has its inner edge welded to the outwardly flared edge of the ring 91. The outer edge of this diaphragm 90 is crimped, welded or otherwise secured to the sealing shoe 92. Gas pressure may enter the space between the diaphragm 90 and the sealing shoe 92 as indicated by the arrows, and thus the shoe 92 is forced outwardly against the rotating valve 10 to seal the port 8 against loss of pressure.

The construction shown in Figure 10 shows the diaphragm 100 welded at its outside edge at 101 to the cylinder head 10f, and at its inside edge at 102 to the shoe 103. In this form of the invention, the assembly of the various parts is facilitated by the accessibility of the welds. This diaphragm is of the single plate type and as it is welded at both ends there can be no pressure loss around its end. The shoe is positioned against rotary travel of the valve 10 by the extension 43 formed on the cylinder head 10f. The diaphragm may if desired be of the multiple plate type.

Figures 11, 12 and 13 illustrate a form of embodiment of this invention similar to Figure 4 in which the diaphragm 110 fits within a chamber 111 between the sealing shoe 113 and the cylinder head 6g. The side walls 112 of this chamber are of less distance apart than the normal distance between the parallel extremities of the diaphragm 110. The detailed construction is shown in Figure 12, and it will be noted that the shoe 113 is shown in spaced relation to the cylinder head 6g for the purpose illustrating the manner of assembly. The diaphragm 110 of the double curved type is placed between the parallel walls 112 and 112a while the shoe 113 is spaced from the head 6g and then the shoe is forced against the cylinder head 6g as shown in Figure 13. Inasmuch as the normal distance between the diagonal positions of the ends of the diaphragm as shown in Figure 11 is greater than the distance between the parallel walls 112, 112a, it will be seen that the diaphragm 110 is contracted laterally. The diaphragm is forced into the restriction 111, with the result that the parallel extremities of the diaphragm are in yieldably pressing contact with the side walls 112, 112a, of the chamber 111, and completely seal the chamber without the necessity for welding, soldering or the like. Furthermore, a pressure is exerted by the diaphragm 110 which tends to force the shoe away from the cylinder head and the shoe is tightly sealed to the cylinder head to prevent loss of pressure. A backing ring 114 is preferably spot welded to the sealing shoe 113 and in a position such that the tensioned end wall 112a will be held from movement. The center portion of the diaphragm 110 rests on the backing ring and when the valve is assembled as shown in Figure 13 the backing ring fills the space between the diaphragm and shoe. As the inner wall 112 is in compression, the backing ring need not initially contact with it.

The diaphragm 110 may be manufactured of suitable sheet steel or other material by an ordinary stamping operation and may be assembled in position by an ordinary press fit without welding. It can therefore be readily disassembled or assembled in repair work and provides a simple manufacturing and repair construction.

Figures 14, 15, 16, 17, and 18 show additional modified forms of construction, the diaphragm 140 in Figure 14 being welded to the cylinder head at the point 141 and being welded to the shoe 142 at the point 143. The insert 144 serves to hold the diaphragm in place during the welding operation and to conduct away the heat. The diaphragm 140 forces the shoe 142 into resilient contact with the valve sleeve and is initially preformed in bell shape as shown in dotted lines so that on fluctuations of pressure, no local stresses are set up as would otherwise occur. In Figures 15 and 16 a double diaphragm is used, which diaphragms 150 and 160 are secured to the cylinder head and shoes 151 and 161 respectively. The diaphragms are each sealed by lock joints 152 and 162 respectively, and, because of the shape thereof, form chambers 153 and 163 respectively, which chambers are subject to gas pressure from the combustion chamber which tends to force the shoes against the valve sleeve.

Similarly in Figures 17 and 18, the diaphragms 170 and 180 are sealed to the cylinder head in this instance by welding at the points 171 and 181 respectively. The diaphragms are also welded to their respective shoes 172 and 182 at the points 173 and 183 respectively. In Figure 17 the shoe will not move with the valve sleeve because it is held by the relatively narrow diaphragm 170. In Figure 18 an additional block 184 is welded at the point 183 to the shoe 182 and the diaphragm 181 to prevent increase in the volumetric capacity of the valve port and to present a smooth path due to the use of the diaphragm. It will be noted in this and in other figures that the cylinder head is cut away at the weld 181 to prevent binding at the rotating end of the valve sleeve which might occur by virtue of the presence of small particles of carbon or unfiltered oil.

Figures 19, 20, and 21 illustrate a further form of the invention in which two diaphrams and two shoes are used to seal the port. The shoe 191 is mounted in a chamber 192 in the cylinder head 6h and is carried by the diaphragm 193 which is welded to the cylinder head 6h at 194, and to the shoe 191 at the point 195. A second shoe 196 is carried within a chamber 197 within the valve sleeve 10 and is secured by the diaphragm 198 to the valve sleeve 10 at the point 199, which diaphragm is welded to the shoe 196 at the point 200. The shoe 196 travels with the valve sleeve 10 and acts against the cylinder wall 5 and seals the outer end of the port while the inner shoe 191 operates between the cylinder head 6h and the valve sleeve 10 to seal the inner portion of the port. The construction is shown in expanded form in Figure 20, showing that the diaphragms 193 and 198 resiliently force the shoes 191 and 196 outward and closely against the adjacent surface of either the valve sleeve 10 or the cylinder wall 5. The port is completely sealed by such construction and in addition the gas pressure will enter between the shoe and the diaphragm and force the shoes against the surfaces in a self-sealing manner.

Figures 22, 23 and 24 show relatively thin shoes 220, 230 and 240 which are curved on both surfaces and they are forced against the valve sleeve by diaphragms 221, 231 and 241 respectively. In Figures 22 and 23, circumferential blocks 222 and 232 are integrally welded with the diaphragms to the cylinder head and offer positioning surfaces for the movable shoes, and in Figure 24, the short diaphragm 241 which is welded to the head at 243 to prevent rotary movement of the shoe due to its frictional contact with the valve sleeve.

Figures 24a and 24b illustrate different modifications of a diaphragm which in cross section is S-shaped. In Figure 24a, the cylinder head 245 has formed therein a circumferential groove 246 in which the inner edge of a diaphragm 247 is received, the outer edge of the diaphragm being received in a similar groove 248, formed in the shoe 249. Both of these grooves are filled with a metal such as solder or the like in order that the edges of the diaphragm 247 may be securely held in position. The diaphragm 247 surrounds the port opening and thus gas pressure may enter the space between the diaphragm 247 and sealing shoe 249 so as to force the sealing shoe 249 against the valve sleeve. In Figure 24b the arrangement of parts is similar to the arrangement shown in Figure 24a with the exception that the circumferential groove formed in the sealing shoe 249 occupies a position that is nearer the edge of the valve port than that occupied by the circumferential groove in the cylinder head. Thus gas pressure is permitted to enter the space between the diaphragm 247 and the cylinder head 245 in order to force the shoe 249 against the valve sleeve.

A slightly modified form of construction is shown in Figure 25 in which the engine is of the rotary disk valve type having the cylinder head 6i and the valve disk 10a which is adapted to close the ports 8a from the combustion chamber 7a whereby the pressure may be maintained within the combustion chamber. The disk valve 10a is rotatably journaled within the cylinder walls 5a and for the purpose of sealing the disk valve, annular diaphragms 250, 251, 252 and 253 of the expansive bellows type are used. The inner edges of these diaphragms are secured in any suitable manner or are formed integral with a series of pairs of rings, the diaphragm 250 having upper and lower rings 254 and 255, the diaphragm 251 having rings 256 and 257, the diaphragm 252 having rings 258 and 259 and the diaphragm 253 having rings 260 and 261. The upper rings 256 and 260, and the lower rings 255 and 259 contact with the disk valve against which they are yieldably held. The remaining rings, which are counterparts of the last mentioned rings bear against the cylinder head wall or the cylinder wall as the case may be. The diaphragms are so designed that they will expand when fluid pressure enters the chamber in which they are contained and thus the ports are sealed against pressure loss.

Another slightly modified form of construction is shown in Figure 26 in which the cylinder head 6k has a central combustion chamber 7 and has but one sealing diaphragm for two valve ports when there are compound valve ports in the cylinder. The intake valve ports 8c are shown in duplicate, as are the exhaust ports 8d. Thus there are four valve ports for a single cylinder. A single sealing diaphragm 265 is adapted to be mounted between a cylinder head 6k and the retaining ring 266, which ring contacts with the shoes 267 and holds them in contact with the valve sleeve 10. The shoes 267 are of a size to span the two ports 8c and 8d so as to prevent leakage on either side thereof. A central projection is formed integrally with the sealing shoe 267. The retaining ring 266 which is split and expanded by taper pins 266a is fitted within the sealing shoe 267 with the outer edge of the diaphragm 255 extending between this ring and the sealing shoe. The sealing arrangement for the ports 8d is identical with the sealing arrangement just described and similar reference numerals have been assigned to corresponding parts. It will be seen that as the valve sleeve rotates diagonally opposed valve ports will open permitting intake of gas to the combustion chamber or exhaust therefrom as the case may be.

In Figures 27 and 28 the use of the diaphragm and movable shoe is shown in connection with the ordinary valves of the high pressure type. In the former figure, a valve casing 270 is provided with ports 273 and 274 which communicate with the casing at right angles to each other. A rotary valve 271 having an elbow passage 272 formed therein, is rotatably mounted within the casing 270 in such a manner that at repeated intervals the two ports 273 and 274 are in communication through the passageway 272. The ports 273 and 274 are each provided with a flexible diaphragm 275, which is in the form of a tubular member having an inwardly directed bulge. These members 275 are substantially identical in construction and a description of one will suffice for the other. One edge of each diaphragm 275 is secured in a portion of the casing 270 while the other edge is secured in a sealing shoe 276. These sealing shoes in the ports 273 and 274 bear against the rotary valve 271 in such manner as to prevent leakage of pressure around the circumference of the valve. In dealing with negative pressures or partial vacuums the diaphragms 275 are provided with outwardly directed bulges so that they will expand when there is a tendency for the bulge to be drawn inwardly.

In Figure 28, the valve casing is designated at 284 while the ports 282 which communicate with the interior of this valve casing are directly opposed to each other. Sealing shoes 283 are carried by the valve 285 and are movable therewith. These sealing shoes are mounted in a central opening 283a which extend through the valve 285 and a tubular diaphragm 280 has its opposite ends secured in the sealing shoes 283. The diaphragm 280 in this form of the invention is of the corrugated bellows type and serves upon the application of pressure fluid thereto to force the sealing shoes 283 apart so that they will bear against the casing 284 and prevent leakage of pressure fluid between the sealing shoes and the casing.

In Figures 29 and 30 an internal combustion engine with a rotatable valve sleeve at right angles to the piston stroke is shown. The valve sleeve 290 is thus adapted to extend over all of the cylinders and is provided with a plurality of sealing plugs 291 to seal the ports 8 and 10a. A central non-rotatable manifold 292 acts as the distributor for the intake and exhaust gases which pass into the combustion chamber 7 over which is mounted the cylinder head 6n. A bellows diaphragm 293 backed up by rings 295 co-operates with the sealing shoes 291 and normally forces the sealing shoes 291 against the valve 290 at both ports to prevent gas leaks. A similar construction of valve seal is shown in Figure 30 in which the valve 290 operates between the outer valve casing 294 and the inner manifold 292 and the ports 8 are sealed by the sealing shoes 291 which are forced into close contact with the valve 290 by the bellows construction 293 as shown in the prior form. In this modification the cylinder head 6m is slightly different however, but is adapted to carry the sealing shoes to seal the valve ports and is water jacketed to cool the valve sleeve on all sides.

It will thus be seen that we have constructed a new form of valve seal which is particularly adapted for use with rotary sleeve valve internal combustion engines although the invention is not restricted thereto as the seal may be effectively used in other forms of fluid valves. With internal combustion engines however, which have high pressures and yet must have large valve clearances due to changes in cylinder temperatures and to reduce valve friction, the present seal may be most effectively used. In such engines, it is essential not only to prevent leaks in combustion pressure to increase the effective power stroke, but it is also essential to reduce compression losses so that a high volumetric capacity may be had as is particularly desired on the present day high ratio expansion engines. It is also desirable to prevent suction pressures where the valve is used as is generally the case in the intake side of the engine. Loss of pressure where generally defined, also includes loss of suction, although the shape of the diaphragm must frequently be changed where suction is contemplated.

The structure in general includes a shoe adapted to surround the valve port and a diaphragm between the valve port and shoe, which shoe is shaped to co-act with the moving valve, and as the area of contact between the shoe and valve is less than the area of the valve, the shoe may fit close to the valve with less clearance than the cylinder head clearance and yet without a substantial increase in friction. The diaphragm acts as a complete seal between the cylinder head and sealing shoe and is resilient to force the shoe into tensioned contact with the valve. As the shoe moves slightly, the pressure within the combustion chamber may co-act with the diaphragm to additionally increase the shoe pressure as desired. The shoe has a width adjacent the port opening in the sleeve greater than the width of the port in the valve to prevent leaks.

Various modified forms of diaphragm seals may be used and they may be welded or otherwise secured to the shoe or cylinder head or otherwise to prevent pressure leaks. Other modifications may also be made within the scope and spirit of this invention and we therefore desire that our description herein and the claims hereinafter appended be considered illustrative of the extent and not as limiting the scope of our invention.

We claim:

1. In an internal combustion engine of the class described having a cylinder head, a rotary valve surrounding said head and having a valve port therein, means carried by said cylinder head adapted to seal said valve port including a bellows and a sealing shoe, said sealing shoe closely fitting against said valve, means to force said shoe into pressure tight contact on the increase of gaseous pressure on said bellows, said cylinder head having projections on each side of the valve ports centering said sealing shoe and preventing rotary motion thereof.

2. In an internal combustion engine of the class described having a cylinder, a cylinder head mounted therein, a rotary valve surrounding said head and having a valve port therein, means carried by said cylinder head adapted to seal said valve port comprising a bellows and a sealing shoe, means to force said sealing shoe into pressure tight contact with said valve by the action of gaseous pressure on said bellows, means carried by said cylinder head centering said sealing shoe and preventing rotary motion thereof, said diaphragm being sealed to said cylinder head on one end and sealed to said shoe on the other end.

3. In an internal combustion engine of the class described the combination of a cylinder head having a port therein, a rotary valve sleeve, a sealing shoe contacting with said sleeve, diaphragm receiving pockets in said head and said shoe surrounding said valve port, and a diaphragm carried in said pocket forcing said shoe against said valve and preventing the loss of gas pressure between said head and said sealing shoe.

4. In an internal combustion engine of the class described the combination of a cylinder head, a rotary valve sleeve having a port therein, a sealing shoe contacting with said valve sleeve, diaphragm receiving pockets in said head and said shoe surrounding said valve port, a diaphragm carried in said pocket, said diaphragm having a double reverse curve and assembled under forced fit, one end of said diaphragm being under compression and the other end under tension, and a backing ring to support the tension end of said diaphragm.

5. In an internal combustion engine of the class described, the combination of a cylinder head, means to water cool said cylinder head, a rotary valve sleeve surrounding said head and having a valve port therein, said cylinder head having a combustion chamber with a valve port therein, and means to prevent gas leaks from said valve port, which comprises a sealing member adjacent said cylinder head, a diaphragm between said cylinder head and said sealing member, said diaphragm being under gas tight seal with said sealing member and said cylinder and preventing gas leaks therefrom, said diaphragm being pre-formed in reverse curve shape to exert transverse and lateral pressure and means to prevent rotary motion of said sealing shoe, said means including an angular portion on the cylinder head and a cooperating portion on the sealing shoe.

6. In an internal combustion engine of the class described having cylinder walls, an upper cylinder block, a cover, a rotary valve sleeve and a suspended cylinder head mounted therein and spaced from the sleeve by said cover, said valve sleeve and cylinder head having communicating valve ports, means to seal said valve ports including a sealing member carried by said cylinder head and resiliently contacting with said valve sleeve, a separate sealing member carried by said valve sleeve and resiliently contacting with said cylinder wall and diaphragms between said carrying members and said sealing members to prevent the escape of gaseous pressure.

7. In a valve of the class described having a ported opening therein, the combination of a sealing member adapted to surround said ported opening and contact with said valve, a pocket adjacent said opening, and a sealing diaphragm mounted in said pocket and cooperating with said sealing member and subject to pressure to increase the tension of said sealing member with respect to said valve to prevent pressure loss, said diaphragm exerting both lateral and transverse pressure in said pocket to prevent loss of pressure.

8. In a sealing device for rotary valve ports, a rotary valve sleeve having ports therein, a cooperating stationary valve member having ports therein and means to seal said ports against leakage, comprising shoes mounted for limited universal movement or play on the stationary member and surrounding said ports, said shoes having a port therein substantially equal in cross section to the port in the valve member and having projecting portions extending on each side beyond the port in the shoe, said projecting portions being greater in length than the width of the port in the valve, and the total width of the sealing shoes being more than three times the width of the valve port in the valve, a pocket formed by said shoes and said stationary valve member, and a diaphragm carried in said pocket behind each of said shoes resiliently urging the shoes against the rotary valve member.

9. In a sealing device for rotary valve ports a rotary sleeve valve having ports therein, a cooperating stationary member within said valve having ports therein and means to seal said ports against leakage, comprising a shoe mounted for limited universal movement or play on the stationary member surrounding said ports, a diaphragm receiving pocket between said stationary member and said shoe, a diaphragm in said pocket behind said shoe resiliently urging the shoe against said rotary valve member, flame protecting means to diminish the heat effect on said diaphragm, and sealing means to uniformly seal the edges of said diaphragm to said stationary member and said shoe and prevent leakage behind said shoe, said shoe being open to gas pressure to increase the tension of the shoe against the valve, said shoe having an overall width adjacent the port opening in the valve three times greater than the width of the port in the valve.

10. In an internal combustion engine of the class described a cylinder, a cylinder head forming a combustion chamber mounted therein, a rotary valve mounted between said cylinder and head and having valve ports therein, means to drive said valve from the top thereof, said cylinder and head having cooperating valve ports, and means to seal said valve ports, comprising a shoe resiliently engaging said valve, said shoe having a port cooperating with said cylinder head port, and a U-shaped spring diaphragm having integral abutting portions in gas tight relation with said shoe and said cylinder head, said abutting portions with integral diaphragm permitting gaseous pressure to enter between the U-shaped diaphragm to force said shoe in pressure tight relation against said valve with the variations of combustion chamber pressures.

11. In an internal combustion engine of the class described having a cylinder head, a rotary valve surrounding said head and having a valve port therein, means carried by said cylinder head adapted to seal said valve port including a bellows and a sealing shoe, said bellows having integral abutting portions in gas tight relation with the sealing shoe and cylinder head and having an opening for the admission of gas pressure to the interior thereof to expand said bellows and to force said shoe into pressure tight contact with the valve, said sealing shoe closely fitting against said valve, said cylinder head having angular projections on each side of the valve ports, centering said sealing shoe and preventing rotary motion thereof, and means to screen the opening in the bellows.

12. In an internal combustion engine having a cylinder head and a rotary valve mounted therein, said cylinder head forming a combustion chamber, means to seal said combustion chamber against pressure loss comprising a sealing shoe, a pocket in said head and said shoe, a plurality of sealing rings mounted in said pockets between said shoe and said cylinder head, and bellows members mounted between said sealing rings to force said sealing shoe into pressure tight contact with said cylinder head and valve respectively, said sealing rings reinforcing the ends of said bellows members and maintaining gas tight seals with the head and shoe.

JOSEPH A. ANGLADA.
AXEL H. ASPROOTH.